US011326052B2

United States Patent
Chen et al.

(10) Patent No.: US 11,326,052 B2
(45) Date of Patent: May 10, 2022

(54) BIODEGRADABLE PLASTIC COMPOSITION AND MANUFACTURING METHOD THEREOF

(71) Applicants: Tatung Company, Taipei (TW); TATUNG UNIVERSITY, Taipei (TW)

(72) Inventors: C. Will Chen, Taipei (TW); Chun-Yeh Chu, Taipei (TW); Ping-Hsun Tsai, Taipei (TW); Ching-Huang Wang, Taipei (TW); Chiung-Cheng Huang, Taipei (TW); Tai-Wei Tseng, Taipei (TW)

(73) Assignees: Tatung Company, Taipei (TW); TATUNG UNIVERSITY, Taipei (TW)

( * ) Notice: Subject to any disclaimer, the term of this patent is extended or adjusted under 35 U.S.C. 154(b) by 233 days.

(21) Appl. No.: 16/739,089

(22) Filed: Jan. 9, 2020

(65) Prior Publication Data

US 2020/0283621 A1    Sep. 10, 2020

(30) Foreign Application Priority Data

Mar. 7, 2019  (TW) .................................. 108107687

(51) Int. Cl.
    *C08L 67/02*    (2006.01)
(52) U.S. Cl.
    CPC .......... *C08L 67/02* (2013.01); *C08L 2201/06* (2013.01); *C08L 2205/03* (2013.01); *C08L 2205/08* (2013.01)
(58) Field of Classification Search
    CPC ................................................... C08L 67/02
    See application file for complete search history.

(56) References Cited

U.S. PATENT DOCUMENTS

| 7,410,783 B2 | 8/2008 | Chen et al. |
| 9,738,784 B2 * | 8/2017 | Allen ...................... C08L 23/10 |
| 10,047,194 B2 | 8/2018 | Chen et al. |

FOREIGN PATENT DOCUMENTS

| CN | 101775129 | 7/2010 |
| CN | 103261269 | 8/2013 |
| CN | 104974450 | 10/2015 |
| CN | 108948680 | 12/2018 |
| TW | 552290 | 9/2003 |
| TW | 200844168 | 11/2008 |
| TW | 201741384 | 12/2017 |

OTHER PUBLICATIONS

"Office Action of Taiwan Counterpart Application", dated Mar. 23, 2020, p. 1-p. 5.
"Office Action of China Counterpart Application", dated Jan. 29, 2022, pp. 1-7.

* cited by examiner

*Primary Examiner* — Michael F Pepitone
(74) *Attorney, Agent, or Firm* — JCIPRNET

(57) ABSTRACT

A biodegradable plastic composition is used to manufacture a biodegradable plastic. The biodegradable plastic composition includes a biodegradable polyester, a polysaccharide, and a modifier. The modifier is used to compound the polysaccharide and the biodegradable polyester to obtain a biodegradable plastic. The biodegradable plastic has a tensile strength greater than 3 MPa and an elongation greater than 81%.

16 Claims, 1 Drawing Sheet

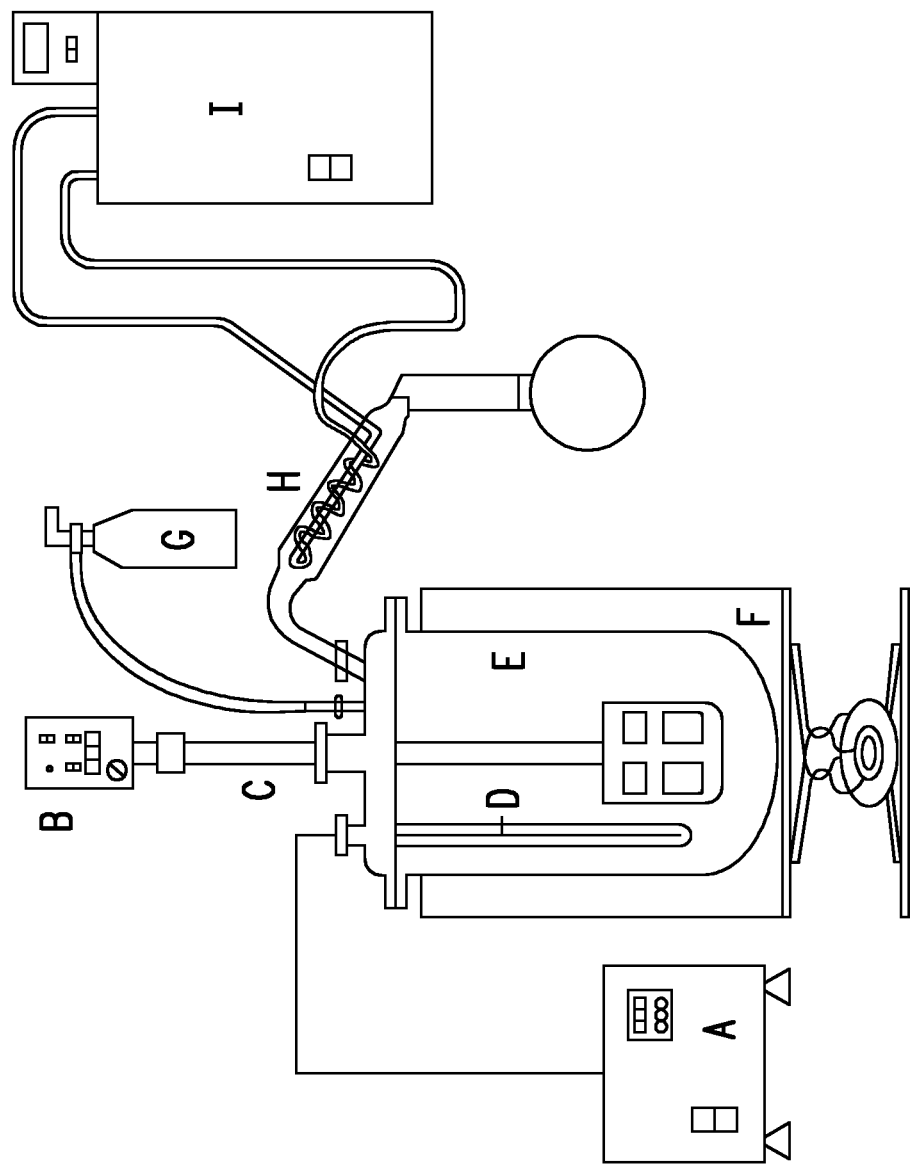

BIODEGRADABLE PLASTIC COMPOSITION AND MANUFACTURING METHOD THEREOF

CROSS-REFERENCE TO RELATED APPLICATION

This application claims the priority benefit of Taiwan application serial no. 108107687, filed on Mar. 7, 2019. The entirety of the above-mentioned patent application is hereby incorporated by reference herein and made a part of this specification.

BACKGROUND OF THE INVENTION

Field of the Invention

The invention is related to a plastic composition and a manufacturing method thereof, and more particularly, to a biodegradable plastic composition and a manufacturing method thereof.

Description of Related Art

Biodegradable polysaccharide compounded plastics are formed by combining naturally decomposable polysaccharides with biodegradable polyesters using compounding technology. In particular, polysaccharides have the functions of reducing manufacturing cost and regulating biodegradability. However, the addition of too much polysaccharide reduces the ductility and toughness of biodegradable plastics, which limits product application.

At present, the physical modifiers used in plastic processing are usually ortho-phthalate ester compounds, which may be used to improve the ductility and toughness of the plastic. However, studies have confirmed that ortho-phthalate ester compounds have reproductive toxicity and some are carcinogenic. In addition, although the more common modifiers used in biodegradable plastics are citrate and sebacate plasticizers, these modifiers have limited effectiveness in improving the ductility and toughness of biodegradable plastics.

SUMMARY OF THE INVENTION

The invention provides a biodegradable plastic composition and a manufacturing method thereof for manufacturing a biodegradable plastic, and the biodegradable plastic has better tensile strength, better elongation, and better toughness.

The biodegradable plastic composition of the invention is used to manufacture a biodegradable plastic. The biodegradable plastic composition includes a biodegradable polyester, a polysaccharide, and a modifier. The modifier is used to compound the polysaccharide with the biodegradable polyester to obtain a biodegradable plastic. The biodegradable plastic has a tensile strength greater than 3 MPa and an elongation greater than 81%.

In an embodiment, based on a total weight of the biodegradable plastic composition, a content of the polysaccharide is 35 wt % to 45 wt %, a content of the biodegradable polyester is 44 wt % to 54 wt %, and a content of the modifier is 1 wt % to 5 wt %.

In an embodiment of the invention, the modifier includes a compound represented by formula 1:

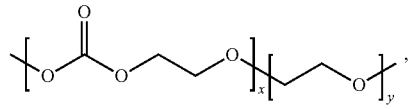

[formula 1]

wherein x is an integer of 8 to 35 and y is an integer of 30 to 74.

In an embodiment of the invention, the modifier includes a low molecular-weight polyethylene ether carbonate, and the low molecular-weight polyethylene ether carbonate is obtained by an open-ring polymerization reaction of a carbonate compound.

In an embodiment of the invention, the carbonate compound includes ethylene carbonate, propylene carbonate, or a combination thereof.

In an embodiment of the invention, the modifier has a number-average molecular weight of 2119 Da to 6836 Da.

In an embodiment of the invention, the modifier has a weight-average molecular weight of 2918 Da to 9542 Da.

In an embodiment of the invention, the biodegradable plastic has a Young's modulus of 300 MPa to 500 MPa.

In an embodiment of the invention, the biodegradable polyester may include poly(butylene terephthalate-ε-caprolactone) (PBTCL), poly(butylene adipate-co-terephthalate) (PBAT), poly(butylene sebacate-co-terephthalate) (PBSbT), poly(butylene succinate-co-terephthalate) (PB ST), polybutylene succinate (PBS), poly(butylene succinate-co-adipate) (PBSA), polycaprolactone (PCL), polylactic acid (PLA), polyhydroxyalkanoate (PHA), polyglycolic acid (PGA), or a combination thereof.

In an embodiment of the invention, the polysaccharide includes a starch or a cellulose.

In an embodiment of the invention, the biodegradable plastic may increase a tensile strength by 3 to 4 times and an elongation by 4 to 5 times.

The manufacturing method of the biodegradable plastic composition of the invention includes the following steps. A mixture is provided, including a biodegradable polyester, a polysaccharide, and a modifier. A compounding process is performed to compound the polysaccharide and the biodegradable polyester in the mixture into a biodegradable plastic. In particular, the biodegradable plastic composition has a tensile strength greater than 3 MPa and an elongation greater than 81%.

In an embodiment of the invention, the manufacturing method of the low molecular-weight polyethylene ether carbonate includes the following steps. First, a carbonate compound and a potassium hydroxide are provided in a modifying equipment, wherein a ratio of a molar number of the potassium hydroxide to the carbonate compound is 1/500 to 1/1500. Next, a reaction is performed at a reaction temperature of 160° C. to 220° C. for 2 hours to 8 hours.

Based on the above, the biodegradable plastic composition and the manufacturing method thereof of the invention may be used to manufacture a biodegradable plastic. In particular, the biodegradable plastic composition includes a biodegradable polyester, a polysaccharide, and a modifier. The modifier is used to compound the polysaccharide and the biodegradable polyester to obtain a biodegradable plastic. The biodegradable plastic has a tensile strength greater than 3 MPa and an elongation greater than 81%. Therefore, the biodegradable plastic composition and the manufacturing method thereof provided by the invention may be used to manufacture a biodegradable plastic having better tensile strength, better elongation, and better toughness.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1 is a schematic of a modifying equipment in an embodiment of the invention.

DESCRIPTION OF THE EMBODIMENTS

In the following, the embodiments of the invention are described in detail. However, the embodiments are exemplary, and the invention is not limited thereto.

In the present embodiment, the biodegradable plastic composition may be used to manufacture a biodegradable plastic. The biodegradable plastic composition may include a biodegradable polyester, a polysaccharide, and a modifier. In particular, the modifier is used to compound the polysaccharide and the biodegradable polyester to obtain a biodegradable plastic. The biodegradable plastic has a tensile strength greater than 3 MPa and an elongation greater than 81%.

The present embodiment is described below, but the invention is not limited thereto.

Biodegradable Polyester

The biodegradable polyester of the present embodiment is, for example, a dibasic acid glycol copolyester, but is not limited thereto. The dibasic acid glycol copolyester is formed by an esterification reaction and a polycondensation reaction of a diol compound and an aliphatic dibasic acid compound having different carbon numbers or an aromatic dibasic acid compound. In particular, biodegradable polyesters having different mechanical properties and physical properties may be synthesized depending on the type and proportion of the monomers.

The biodegradable polyester of the present embodiment may include poly(butylene terephthalate-ε-caprolactone), poly(butylene adipate-co-terephthalate), poly(butylene sebacate-co-terephthalate), poly(butylene succinate-co-terephthalate), polybutylene succinate, poly(butylene succinate-co-adipate), polycaprolactone, polylactic acid, polyhydroxyalkanoate, polyglycolic acid, or a combination thereof, but is not limited thereto.

In the present embodiment, based on the total weight of the biodegradable plastic composition, the content of the biodegradable polyester is, for example, 40 wt % to 60 wt %, preferably 44 wt % to 54 wt %, more preferably 47 wt % to 50 wt %.

Polysaccharide

The polysaccharide of the present embodiment may be a polymer that may be naturally decomposed in nature, such as starch or cellulose, but is not limited thereto. In particular, the polysaccharide may be compounded with the biodegradable polyester into a biodegradable plastic to reduce product cost and regulate biodegradability (for example, the decomposition time period).

In the present embodiment, based on the total weight of the biodegradable plastic composition, the content of the polysaccharide is, for example, 30 wt % to 50 wt %, preferably 35 wt % to 45 wt %, more preferably 38 wt % to 42 wt %.

Modifier

The modifier of the present embodiment may be used to compound the polysaccharide and the biodegradable polyester to form a biodegradable plastic. In particular, the number-average molecular weight of the modifier is 2119 Da to 6836 Da. The weight-average molecular weight of the modifier is 2918 Da to 9542 Da. In addition, the modifier may be used to enhance the physical properties of the biodegradable plastic, including tensile strength and elongation.

The modifier of the present embodiment includes a compound represented by formula 1:

[formula 1]

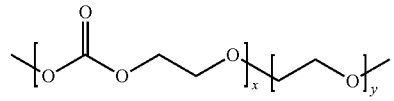

wherein x is an integer of 8 to 35 and y is an integer of 30 to 74.

The modifier of the present embodiment includes low molecular-weight polyethylene ether carbonate (LPEEC), which is obtained by an open-ring polymerization reaction of a carbonate compound. In particular, the carbonate compound may include ethylene carbonate (EC), propylene carbonate (PC), or a combination thereof, but is not limited thereto.

In particular, EC is an organic solvent that may be used as an absorbent for lithium battery electrolytes or acid gases, or as a raw material for polymer synthesis, such as polycarbonate, unsaturated polyester, and polyurethane. Early EC is prepared by a phosgene method, but the phosgene method is banned by various countries due to the high toxicity and serious environmental pollution thereof. However, the EC of the present embodiment is prepared by an addition reaction using carbon dioxide and ethylene oxide, thereby avoiding toxicity and pollution and facilitating the removal of carbon dioxide.

In the present embodiment, based on the total weight of the biodegradable plastic composition, the content of the modifier is, for example, 1 wt % to 10 wt %, preferably 1 wt % to 5 wt %, more preferably 2 wt % to 4 wt %.

Several experiments are described below to more specifically describe the biodegradable plastic composition of the invention. Although the following experiments are described, the materials used and the amount and ratio thereof, as well as handling details, handling process etc., may be suitably modified without exceeding the scope of the invention. Accordingly, restrictive interpretation should not be made to the invention based on the experiments described below. Examples are provided below to describe the invention in detail, but the invention is not limited to the contents disclosed in the examples.

<Manufacture of LPEEC>

In some embodiments, the LPEEC may be obtained from an open-ring copolymerization reaction of ethylene carbonate. Therefore, ethylene carbonate may be first prepared by an addition reaction using carbon dioxide ($CO_2$) and ethylene oxide ($C_2H_4O$), as shown in reaction formula 1. A catalyst may be added during the reaction to accelerate the reaction, and the catalyst may be bis(triphenylphosphine) nickel ($[(C_6H_5)_3P]_2Ni$), but is not limited thereto.

[reaction formula 1]

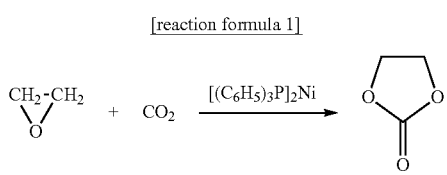

Next, the ethylene carbonate was modified by the modifying equipment of FIG. 1, that is, the ethylene carbonate was subjected to an open-ring polymerization reaction to obtain a LPEEC, as shown in reaction formula 2. In formula 2, x is an integer of 8 to 35 and y is an integer of 30 to 74.

[reaction formula 2]

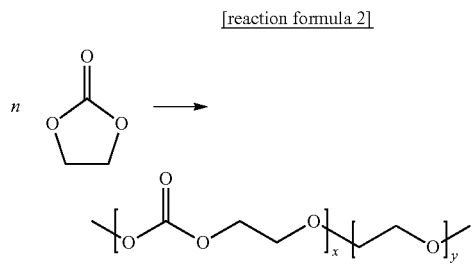

FIG. 1 is a schematic of a modifying equipment in an embodiment of the invention. Referring to FIG. 1, the modifying equipment includes: a thermostat A, a stirring motor and torque recorder B, a stirring rod C, a thermocouple D, a glass reaction bottle E, a heating pack F, a nitrogen cylinder G, a condenser H, and a refrigeration cycle tank I. In the present embodiment, the desired amount of ethylene carbonate (EC) monomer was first placed in the glass reaction bottle E of the modifying equipment, and then potassium hydroxide (KOH) (the ratio of the molar numbers of KOH to EC is 1/500 to 1/1500) was added according to the modifying conditions of Table 1, nitrogen gas was supplied, and the stirring motor and torque recorder B was set to a rotation speed of 600 rpm. Then, the thermostat A was further regulated to heat the heating pack F, and when the internal temperature of the glass reaction bottle E reached the set temperature (160, 180, 200, 220° C.), the modifying reaction time was counted (2, 4, 6, and 8 hr). When the reaction time was reached, the heating was stopped and the stirring was stopped to obtain a sample containing LPEEC. After the temperature of the sample was dropped to room temperature, the sample was collected and stored in a serum bottle as a modifier in the biodegradable plastic composition.

TABLE 1

| Serial number | Reaction time (hr) | Reaction temperature (° C.) | EC (mol) | KOH/EC (mol/mol) |
|---|---|---|---|---|
| 1 | 2 | 200 | 1 | 1/1000 |
| 2 | 4 | 200 | 1 | 1/1000 |
| 3 | 6 | 200 | 1 | 1/1000 |
| 4 | 8 | 200 | 1 | 1/1000 |
| 5 | 6 | 160 | 1 | 1/1000 |
| 6 | 6 | 180 | 1 | 1/1000 |
| 7 | 6 | 200 | 1 | 1/1000 |
| 8 | 6 | 220 | 1 | 1/1000 |
| 9 | 6 | 200 | 1 | 1/1500 |
| 10 | 6 | 200 | 1 | 1/1000 |
| 11 | 6 | 200 | 1 | 1/500 |

<Manufacture of Biodegradable Plastic>

According to the formulation of the biodegradable plastic composition of Table 2, the biodegradable plastic was manufactured in an extruder by a compounding processing technique. In particular, PBAT may be used as a biodegradable polyester, corn starch may be used as a polysaccharide, EC was used as the modifier of Comparative examples 1 to 4, and the LPEEC in Serial number 1 of Table 1 was used as the modifier of Experimental example 1. In particular, LPEEC was obtained by reacting EC with the modifying conditions of Table 1 (KOH/EC=1/1000 (mol/mol), reaction temperature: 200° C., reaction time: 2 hr).

TABLE 2

| | PBAT (g) | Corn starch (g) | Water (g) | Glycerin (g) | EC (g) | KOH (g) | LPEEC (g) |
|---|---|---|---|---|---|---|---|
| Comparative example 1 | 240 | 195 | 20 | 35 | 0 | 0 | 0 |
| Comparative example 2 | 240 | 195 | 20 | 35 | 0 | 0.01 | 0 |
| Comparative example 3 | 240 | 195 | 20 | 20 | 15 | 0 | 0 |
| Comparative example 4 | 240 | 195 | 20 | 20 | 15 | 0.01 | 0 |
| Experimental example 1 | 240 | 195 | 20 | 20 | 0 | 0 | 15 |

<Mechanical Property Test>

Next, the biodegradable plastics prepared according to the biodegradable plastic composition of Table 2 were subjected to mechanical property testing, and the results are shown in Table 3. In detail, in the present embodiment, the items of the mechanical property testing include tensile strength, elongation, and Young's modulus. In particular, tensile strength is the ability of the test material to resist fracture when pulled or the maximum tensile force that the test material may withstand without breaking. Elongation is the percentage of the test material that is deformed when pulled compared to the original length before the material sample is fractured. In general, the larger the elongation, the greater the ductility of the material, and the more suitable the material is as a film product. Young's modulus is the ratio of tensile strength to elongation, so when the Young's modulus is too large, the material is harder and more brittle and the ductility is low. Conversely, when the Young's modulus is too small, the material is too weak. A moderate Young's modulus may show the toughness of the material. In the present embodiment, the Young's modulus is, for example, 300 MPa to 500 MPa, preferably 310 MPa to 400 MPa, and more preferably 330 MPa to 360 MPa.

TABLE 3

| | Tensile strength (MPa) | Elongation (%) | Young's modulus (MPa) |
|---|---|---|---|
| Comparative example 1 | 2.2 ± 0.1 | 11.0 ± 2.3 | 531.5 ± 43.1 |
| Comparative example 2 | 2.2 ± 0.4 | 15.0 ± 1.1 | 611.3 ± 10.9 |

TABLE 3-continued

| | Tensile strength (MPa) | Elongation (%) | Young's modulus (MPa) |
|---|---|---|---|
| Comparative example 3 | 5.5 ± 0.8 | 45.0 ± 5.2 | 453.2 ± 17.0 |
| Comparative example 4 | 2.4 ± 0.4 | 29.6 ± 6.0 | 570.9 ± 23.4 |
| Experimental example 1 | 3.3 ± 0.7 | 83.1 ± 8.8 | 341.0 ± 38.3 |

According to the results of Table 3, compared with Comparative examples 1 to 4 (using EC as the modifier), the biodegradable plastic of Experimental example 1 (using the LPEEC in serial number 1 of Table 1 as the modifier) has a tensile strength greater than 3 MPa, an elongation greater than 81%, and a Young's modulus between 330 MPa and 360 MPa. That is, the biodegradable plastic of Experimental example 1 has better ductility and toughness than Comparative examples 1 to 4.

The following is a discussion of the results of testing the mechanical properties of the compounded biodegradable plastic by LPEEC manufactured with different reaction times, reaction temperatures, or KOH concentrations.

<Discussion on Different Reaction Times>

The LPEEC manufactured using serial numbers 1 to 4 in Table 1 was used as the modifier, and then PBAT and corn starch were compounded into biodegradable plastics (Experimental examples 1 to 4). Then, the mechanical properties of the biodegradable plastics of Experimental examples 1 to 4 were tested, and the results are shown in Table 4. In particular, in the reaction conditions of serial numbers 1 to 4, the fixed reaction temperature is 200° C., the fixed KOH concentration is KOH/EC=0.001 mol/mol, and the reaction time is changed in order to 2 hr, 4 hr, 6 hr, and 8 hr.

TABLE 4

| | Reaction time (hr) | Tensile strength (MPa) | Elongation (%) | Young's modulus (MPa) | Number-average molecular weight (Da) | Weight-average molecular weight (Da) | Number of molecules x | Number of molecules y |
|---|---|---|---|---|---|---|---|---|
| Comparative example 4 | 0 | 2.4 ± 0.4 | 29.6 ± 6.0 | 570.9 ± 23.4 | — | — | — | — |
| Experimental example 1 | 2 | 3.3 ± 0.3 | 83.1 ± 8.8 | 341.0 ± 38.3 | 6836 | 9542 | 35 | 74 |
| Experimental example 2 | 4 | 5.1 ± 0.3 | 123.9 ± 1.8 | 212.3 ± 8.4 | 3966 | 5288 | 17 | 51 |
| Experimental example 3 | 6 | 7.8 ± 0.2 | 141.6 ± 0.5 | 249.2 ± 13.7 | 3117 | 4068 | 13 | 40 |
| Experimental example 4 | 8 | 6.3 ± 0.1 | 95.3 ± 5.2 | 432.4 ± 24.1 | 2119 | 2918 | 8 | 30 |

According to the results of Table 4, compared with Comparative example 4, the biodegradable plastics of Experimental examples 1 to 4 all have a tensile strength greater than 3 MPa, an elongation greater than 81%, and a Young's modulus between 212 MPa and 432 MPa. In particular, compared with Experimental examples 1 and 4, Experimental examples 2 to 3 simultaneously have better tensile strength (greater than 4 MPa), elongation (greater than 100%), and Young's modulus (less than 300 MPa). That is to say, the LPEEC manufactured at the reaction time of 4 to 6 hours may make the biodegradable plastic have better ductility and toughness. More specifically, compared with the tensile strength and elongation of Comparative example 4, in Experimental example 3, the tensile strength may be increased by about 3 to 4 times and the elongation may be increased by 4 to 5 times.

<Discussion on Different Reaction Temperatures>

The LPEEC manufactured using serial numbers 1 to 4 in Table 5 was used as the modifier, and then PBAT and corn starch were compounded into biodegradable plastics (Experimental examples 5 to 8). Then, the mechanical properties of the biodegradable plastics of Experimental examples 5 to 8 were tested, and the results are shown in Table 5. In particular, in the reaction conditions of serial numbers 5 to 8, the fixed reaction time is 6 hr, the fixed KOH concentration is KOH/EC=0.001 mol/mol, and the reaction temperature is changed in order to 160° C., 180° C., 200° C., and 220° C.

TABLE 5

| | Reaction temperature (° C.) | Tensile strength (MPa) | Elongation (%) | Young's modulus (MPa) |
|---|---|---|---|---|
| Comparative example 4 | 0 | 2.4 ± 0.4 | 29.6 ± 6.0 | 570.9 ± 23.4 |
| Experimental example 5 | 160 | 4.4 ± 0.2 | 84.8 ± 7.0 | 383.6 ± 10.0 |
| Experimental example 6 | 180 | 4.2 ± 0.2 | 86.0 ± 5.3 | 305.4 ± 38.1 |
| Experimental example 7 | 200 | 7.8 ± 0.2 | 141.6 ± 0.5 | 249.2 ± 14.2 |
| Experimental example 8 | 220 | 5.3 ± 0.5 | 120.5 ± 2.0 | 381.7 ± 24.1 |

According to the results of Table 5, compared with Comparative example 4, the biodegradable plastics of Experimental examples 5 to 8 all have a tensile strength greater than 3 MPa, an elongation greater than 81%, and a Young's modulus between 249 MPa and 383 MPa. In particular, compared with Experimental examples 5 to 6 and 8, Experimental example 7 simultaneously has better tensile strength (greater than 4 MPa), elongation (greater than 100%), and Young's modulus (less than 300 MPa). That is to say, the LPEEC manufactured at the reaction temperature of 200° C. may make the biodegradable plastic have better ductility and toughness.

<Discussion on Different KOH Concentrations>

The LPEEC manufactured using serial numbers 5 to 11 in Table 1 was used as the modifier, and then PBAT and corn starch were compounded into biodegradable plastics (Experimental examples 5 to 11). Then, the mechanical properties of the biodegradable plastics of Experimental examples 9 to 11 were tested, and the results are shown in Table 6. In particular, in the reaction conditions of serial numbers 9 to 11, the fixed reaction time is 6 hr, the fixed reaction temperature is 200° C., and the KOH concentration is changed in order to KOH/EC=1/1500, 1/1000, 1/500 mol/mol.

TABLE 6

|  | KOH/EC (mol/mol) | Tensile strength (MPa) | Elongation (%) | Young's modulus (MPa) |
|---|---|---|---|---|
| Comparative example 4 | 1/1000 | 2.4 ± 0.4 | 29.6 ± 6.0 | 570.9 ± 23.4 |
| Experimental example 9 | 1/1500 | 4.7 ± 0.6 | 130.4 ± 1.5 | 249.3 ± 3.1 |
| Experimental example 10 | 1/1000 | 7.8 ± 0.2 | 141.6 ± 0.5 | 249.2 ± 14.2 |
| Experimental example 11 | 1/500 | 6.4 ± 1.0 | 135.6 ± 10.1 | 251.0 ± 40.25 |

According to the results of Table 6, compared with Comparative example 4, the biodegradable plastics of Experimental examples 9 to 11 all have a tensile strength greater than 3 MPa, an elongation greater than 81%, and a Young's modulus between 249 MPa and 251 MPa. In particular, Experimental examples 9 to 11 simultaneously have better tensile strength (greater than 4 MPa), elongation (greater than 100%), and Young's modulus (less than 300 MPa). That is to say, the LPEEC manufactured at the KOH concentration of KOH/EC=1/1500, 1/1000, or 1/500 mol/mol may make the biodegradable plastic have better ductility and toughness.

Based on the above, the biodegradable plastic composition and the manufacturing method thereof of the invention may be used to manufacture a biodegradable plastic. In particular, the biodegradable plastic composition includes a biodegradable polyester, a polysaccharide, and a modifier. The modifier is used to compound the polysaccharide and the biodegradable polyester to obtain a biodegradable plastic. The biodegradable plastic has a tensile strength greater than 3 MPa and an elongation greater than 81%. Therefore, the biodegradable plastic composition and the manufacturing method thereof provided by the invention may be used to manufacture a biodegradable plastic having better tensile strength, better elongation, and better toughness.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A biodegradable plastic composition or manufacturing a biodegradable plastic, comprising:
   a biodegradable polyester;
   a polysaccharide; and
   a modifier for compounding the polysaccharide and the biodegradable polyester to obtain the biodegradable plastic, wherein the biodegradable plastic has a tensile strength greater than 3 MPa and an elongation greater than 81%,
   wherein the modifier comprises a compound represented by formula 1:

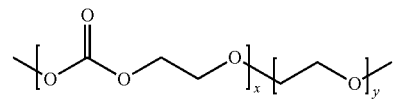

[formula 1]

wherein x is an integer of 8 to 35 and y is an integer of 30 to 74.

2. The biodegradable plastic composition of claim 1, wherein based on a total weight of the biodegradable plastic composition, a content of the polysaccharide is 35 wt % to 45 wt %, a content of the biodegradable polyester is 44 wt % to 54 wt %, and a content of the modifier is 1 wt % to 5 wt %.

3. The biodegradable plastic composition of claim 1, wherein the modifier comprises a low molecular-weight polyethylene ether carbonate, and the low molecular-weight polyethylene ether carbonate is obtained by an open-ring polymerization reaction of a carbonate compound which comprises ethylene carbonate.

4. The biodegradable plastic composition of claim 1, wherein the modifier has a number-average molecular weight of 2119 Da to 6836 Da.

5. The biodegradable plastic composition of claim 1, wherein the modifier has a weight-average molecular weight of 2918 Da to 9542 Da.

6. The biodegradable plastic composition of claim 1, wherein the biodegradable plastic has a Young's modulus of 300 MPa to 500 MPa.

7. The biodegradable plastic composition of claim 1, wherein the biodegradable polyester comprises poly(butylene terephthalate-ε-caprolactone), poly(butylene adipate-co-terephthalate), poly(butylene sebacate-co-terephthalate), poly(butylene succinate-co-terephthalate), polybutylene succinate, poly(butylene succinate-co-adipate), polycaprolactone, polylactic acid, polyhydroxyalkanoate, polyglycolic acid, or a combination thereof.

8. The biodegradable plastic composition of claim 1, wherein the polysaccharide comprises a starch or a cellulose.

9. The biodegradable plastic composition of claim 1, wherein the biodegradable plastic may increase the tensile strength by 3 to 4 times and the elongation by 4 to 5 times.

10. A manufacturing method of a biodegradable plastic composition, comprising:
    providing a biodegradable polyester, a polysaccharide, and a modifier;
    performing a compounding process to compound the polysaccharide and the biodegradable polyester into a biodegradable plastic having a tensile strength greater than 3 MPa and an elongation greater than 81%,
    wherein the modifier comprises a compound represented by formula 1:

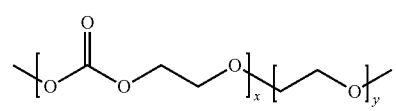

[formula 1]

wherein x is an integer of 8 to 35 and y is an integer of 30 to 74.

11. The manufacturing method of the biodegradable plastic composition of claim 10, wherein based on a total weight of the biodegradable plastic composition, a content of the polysaccharide is 35 wt % to 45 wt %, a content of the biodegradable polyester is 44 wt % to 54 wt %, and a content of the modifier is 1 wt % to 5 wt %.

12. The manufacturing method of the biodegradable plastic composition of claim 10, wherein the modifier comprises a low molecular-weight polyethylene ether carbonate, and the low molecular-weight polyethylene ether carbonate is obtained by an open-ring polymerization reaction of a carbonate compound which comprises ethylene carbonate.

13. The manufacturing method of the biodegradable plastic composition of claim 12, wherein the manufacturing method of the low molecular-weight polyethylene ether carbonate comprises:

providing a carbonate compound and a potassium hydroxide in a modifying equipment, wherein a ratio of a molar number of the potassium hydroxide to the carbonate compound is 1/500 to 1/1500; and reacting at a reaction temperature of 160° C. to 220° C. for 2 hours to 8 hours.

14. The manufacturing method of the biodegradable plastic composition of claim 10, wherein the modifier has a number-average molecular weight of 2119 Da to 6836 Da.

15. The manufacturing method of the biodegradable plastic composition of claim 10, wherein the modifier has a weight-average molecular weight of 2918 Da to 9542 Da.

16. The manufacturing method of the biodegradable plastic composition of claim 10, wherein the biodegradable plastic has a Young's modulus of 300 MPa to 500 MPa.

\* \* \* \* \*